United States Patent [19]

Eicher et al.

[11] Patent Number: 4,475,738
[45] Date of Patent: Oct. 9, 1984

[54] DYNAMIC SEAL ARRANGEMENT WITH X-SHAPED SEAL

[75] Inventors: Fred C. Eicher, Louisville; Charles F. Evans, La Grange, both of Ky.

[73] Assignee: Hilliard Lyons Patent Management Inc., Louisville, Ky.

[21] Appl. No.: 368,565

[22] Filed: Apr. 15, 1982

[51] Int. Cl.³ .................... F16J 15/32; F16J 15/48
[52] U.S. Cl. .................. 277/206 A; 277/12; 277/27; 277/178; 277/184; 92/122
[58] Field of Search ............... 277/12, 32, 205, 206 R, 277/206 A, 184, 27, 178; 92/122; 49/479, 489

[56] References Cited

U.S. PATENT DOCUMENTS

| | | | |
|---|---|---|---|
| 2,700,561 | 1/1955 | Svenson | 277/206 A X |
| 2,790,520 | 4/1957 | Kuhn | 92/122 X |
| 2,806,451 | 9/1957 | Vinkler et al. | 92/122 X |
| 2,841,429 | 7/1958 | McCuistion | 277/206 A X |
| 2,873,132 | 2/1959 | Tanner | 277/206 A X |
| 3,007,723 | 11/1961 | Clarke | 277/206 A X |
| 3,030,934 | 4/1962 | Herbst | 92/122 |
| 3,053,236 | 9/1962 | Self et al. | 92/122 X |
| 3,158,376 | 11/1964 | Rentschler | 277/205 |
| 3,189,360 | 6/1965 | Haberkorn | 277/205 |
| 3,494,414 | 2/1970 | Warner | 277/206 A X |
| 3,563,557 | 2/1971 | Doutt | 277/178 |
| 3,854,737 | 12/1974 | Gilliam | 277/205 |

FOREIGN PATENT DOCUMENTS

| | | | |
|---|---|---|---|
| 1173682 | 10/1958 | France | 277/295 |
| 926789 | 5/1963 | United Kingdom | 277/206 A |

*Primary Examiner*—Robert S. Ward
*Attorney, Agent, or Firm*—Edward M. Steutermann

[57] ABSTRACT

An elongate elastomeric seal member including a first portion to be partially received in an elongate groove of a selected element where the groove has opposite sides and a base connecting the sides and a second portion extending outwardly from the opposite edges of the groove to sealably engage a sealing surface adjacent the element where fluid pressure is selectively applied to at least one side of the seal and where the seal, in cross section, includes a central body with first and second spaced feet extending outwardly therefrom to be received in the groove and engage the sides and base of the groove and third and fourth feet extending outwardly from the central element to slidably engage the sealing surface wherein fluid can be applied to at least one of the third and fourth feet to urge one of said third and fourth feet to sealing relation with said sealing surface.

10 Claims, 8 Drawing Figures

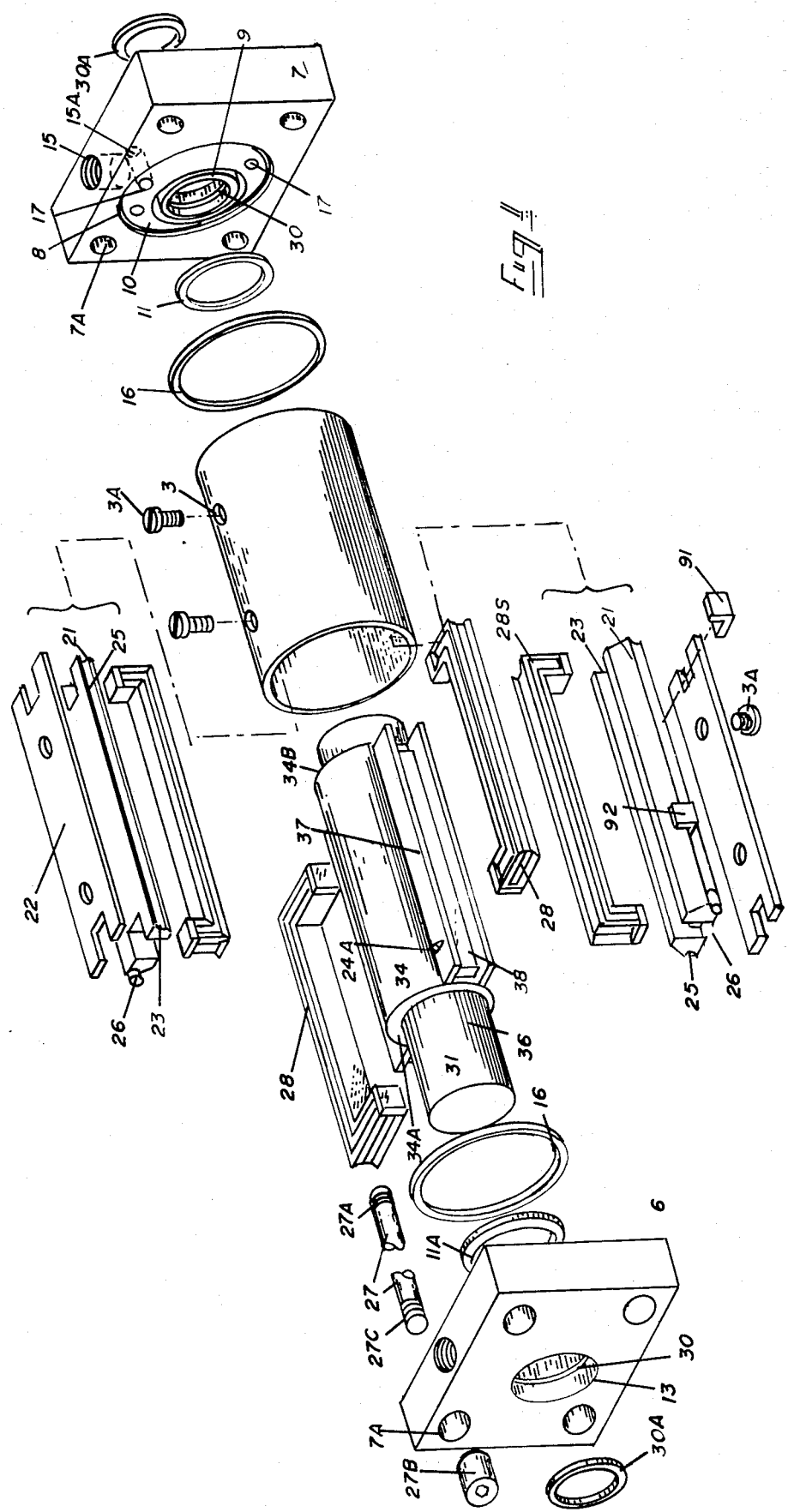

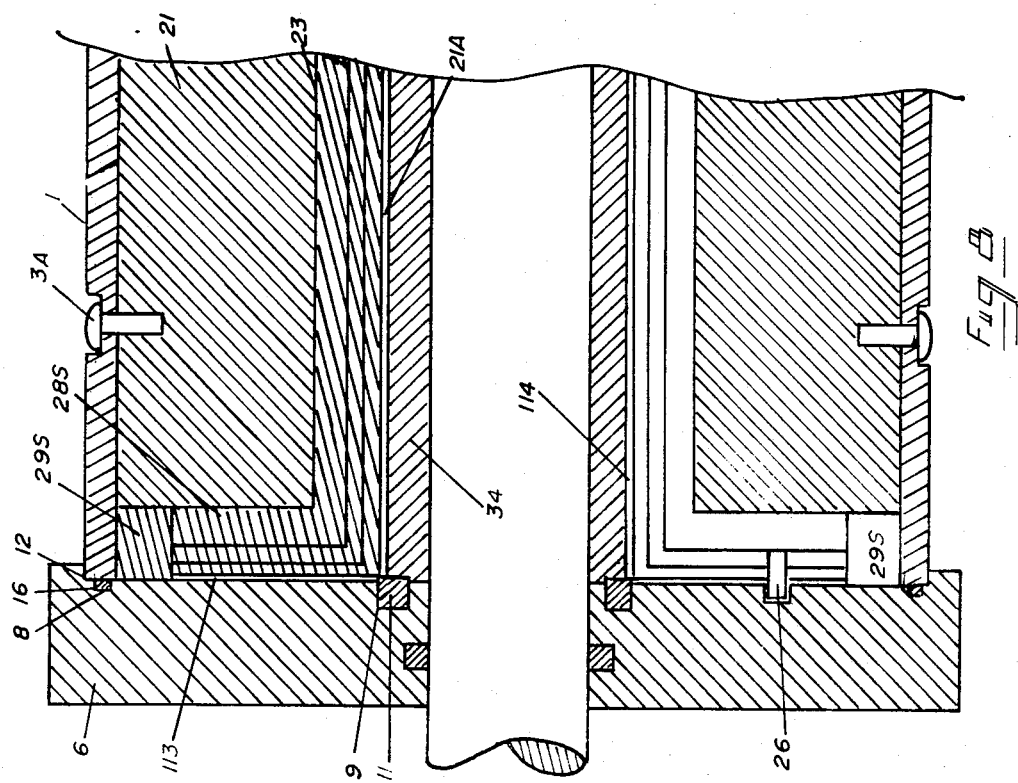
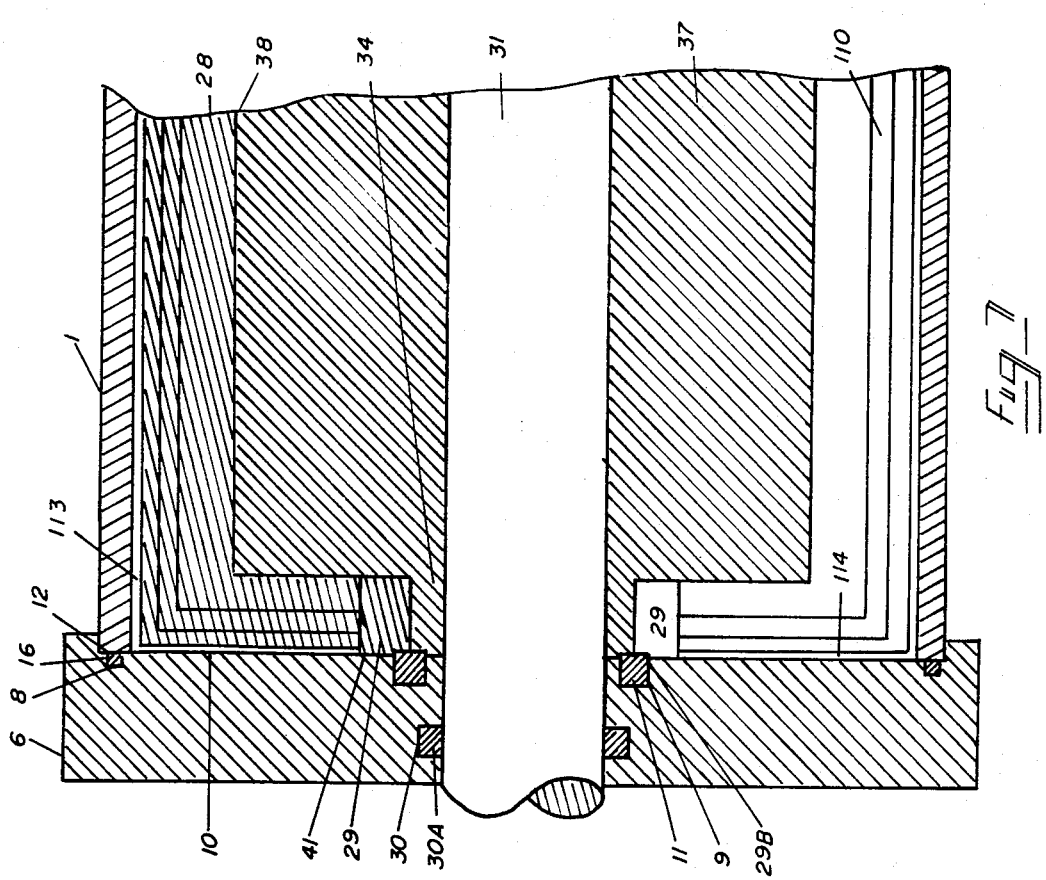

DYNAMIC SEAL ARRANGEMENT WITH X-SHAPED SEAL

BACKGROUND OF THE INVENTION

This invention relates generally to fluid motors, more particularly to rotor and stator seals for vane operated fluid actuated, oscillating reversing motor adapted to provide reciprocatory rotary motion through a portion of a revolution.

Devices of the type are capable of many uses such as closing or opening valves, toggling, camming, clamping, positioning, etc. and the like or performing other services, particularly where "push-pull" or reciprocatory movements are involved. Such actuators usually embody a housing head, a chamber in which a vane is moved first in one direction and then the other to provide a rotary action on a cooperative shaft throughout a portion of a revolution. In such arrangements the vane is impelled to and fro by the pressure of the fluid admitted to one side or the other of the piston or vane within the chamber and with the concurrent exhaust of fluid at the opposite side. Stators can be provided in some such devices to define additional chambers.

Previous arrangements in such rotary type actuators have required frequent servicing and replacement of the seals due to wear, particularly under heavy duty service to assure satisfactory operation of the device with a minimum amount of fluid leakage. Prior art arrangements generally provide seals for pneumatic system where the leakage rate is in the order of 0.1 cubic feet per minute and in some instances the leak rate is considerably higher.

Various prior art arrangements are available, but in such arrangements in pneumatic systems, the pressure required for initial movement of the shaft is excessive due to friction caused by the prior art sealing arrangements.

One prior art arrangement is shown in U.S. Pat. No. 3,128,679,—Trendle wherein a rotary device is shown having a chamber with a vane and a seal arrangement including an internal seal formed around the inner end of a shaft bore where the shaft passes through the head of the device. Trendle utilizes a seal member of generally square cross section.

Somewhat similar devices are shown in U.S. Pat. No. 2,806,451—Vinkler and U.S. Pat. No. 3,682,050—Hyde. In both arrangements, two piece vane seals are shown.

Other arrangements for vane type actuators are shown in U.S. Pat. No. 3,131,610—Paulus, wherein a seal arrangement is provided around the entire periphery of the vane and in U.S. Pat. No 3,179,020 where a split vane is provided with a seal captured between the sections of the vane.

Our Co-pending application Ser. No. 235,533 filed Feb. 18, 1981 shows a seal arrangement which is generally satisfactory but the present invention provides a seal having features not taught in the aforenoted application.

No prior seal is known for use in an actuator device which does not require stiffening or backup support when applied to a vane or stator member in a rotary actuator device to prevent rolling or twisting of the seal under dynamic conditions.

SUMMARY OF THE INVENTION

The present invention provides a novel seal for a fluid powered actuator which includes a shaft movable between first and second positions less than one full revolution and where the force required to move the shaft is minimized while the rate of leakage from the device is minimized by use of the seal.

Moreover, vane seals in accordance with the present invention provide a fluid powered actuator with a leak rate substantially less than 0.1 cubic feet per minute while providing an arrangement which requires less force for operation, particularly break away torque.

More particularly, the present invention provides an elongate elastomeric seal member a first portion to be partially received in an elongate groove of a selected element where the groove has opposite sides and a base connecting the sides and a second portion extending outwardly from the opposite edges of the groove to sealably engage a sealing surface adjacent the element where fluid pressure is selectively applied to at least one side of the seal and where the seal, in cross section, includes a central body with first and second spaced feet extending outwardly therefrom to be received in the groove and engage the sides and base of the groove and third and fourth feet extending outwardly from the central element to slidably engage the sealing surface wherein fluid can be applied to at least one of the third and fourth feet to urge one of said third and fourth feet to sealing relation with said sealing surface.

Examples within the scope of the present invention are illustrated and described in the accompanying drawings and it will be understood that various other arrangements also within the scope of the present invention will occur to those skilled in the art upon reading the disclosure set forth hereinafter.

BRIEF DESCRIPTION OF THE DRAWINGS

Examples in accordance with the present invention are shown in the accompanying drawings wherein:

FIG. 7 is a view taken along a plane passing through line 7—7 of FIG. 6; and

FIG. 8 is a view taken along a plane passing through line 8—8 of FIG. 2.

DETAILED DESCRIPTION OF THE DRAWINGS

Figure 1:
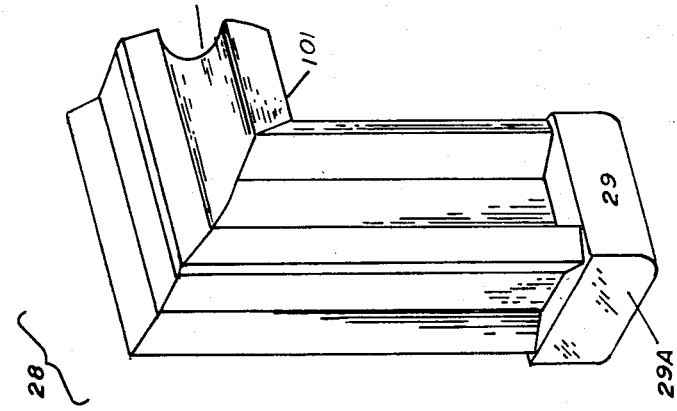
FIG. 1 is an exploded view of one arrangement within the scope of the present invention.

Referring first to FIG. 1 which is an exploded view of one arrangement within the scope of the present invention for 90° rotation of the type shown in our previously described copending application, a cylindrical body 1 is shown defining an internal chamber 2 to receive the elements illustrated in exploded form.

Body 1 can be fabricated from any suitable material, for example, hardened anodized aluminum, steel or stainless steel.

It has been found that the unique seal arrangement provided by the present invention permits the use of a commercial tolerance tube which provides significant cost savings over prior art devices requiring special tolerance tubes. Heads 6 and 7 are provided at opposite ends of body 1 and each includes an annular groove 8 (the corresponding annular groove and inner side configuration of head 6 not being shown, it being understood that heads 6 and 7 are the same in that each includes aligned grooves where head 6 is adapted to be received on the end of body member 1, opposite the end receiving head 7) to receive sealing ring 16 where body 1 is received sealing relation in sealing relation on seal 16.

A second internal groove 9 is provided in each head 6, 7 inset from a central opening 13 as described hereinafter to receive a sealing ring 11 as described hereinafter. An inset bearing surface 10 is provided in each head inside groove 8 to receive the seals of a rotor vane and stator as described hereinafter. A central aperture 13 is provided in each head 6, 7, as shown where in assembled form apertures 13 are in longitudinally aligned relation to receive opposite ends of a shaft 31 of a rotor assembly as described hereinafter. A peripherial internal groove 30 can be provided in each of the central apertures 13 of each head 6 and 7 to receive an "O" ring seal 30A to prevent inward migration of grit or other contaminates.

Alignment apertures 17 can be provided in each head 6, 7 to receive an alignment post described hereinafter carried by the stator assembly also described hereinafter. Also each head 6 and 7 is provided with communicating fluid inlet/outlet 15-15A to communicate with chamber 2 when the unit is assembled to selectively provide admission and exhaust of operating fluid. In FIG. 1, aperture 15 is shown communicating with an aperture 15A in head 7. A similar fluid inlet/outlet is provided in head 6 but is not shown in FIG. 1, only opening 15 being shown.

A rotor assembly 36 is provided with, for example, vanes 37 extending outwardly from an enlarged portion 34 of generally circular outer peripherial configuration and carried by shaft 31. While an arrangement is shown in FIG. 1 providing 2 vanes other arrangements providing single or multiple vane can also be included within the scope of the present invention for use in devices operable between other limits.

The surface of enlarged portion 34 provides a stator vane sealing surface and extends along a portion of the length of shaft 31 which is approximately equal to the length of body 1 so ends 34A and 34B of enlarged portion 34 abut seals 11 of heads 6, 7 when the unit is assembled as described hereinafter. Each vane 37 includes grooves 38 around the free periphery thereof adapted to receive channel shaped sealing members 28 within the scope of the present invention as described hereinafter.

In the arrangement shown cross bores 24A-24B (FIG. 6) are provided to extend through enlarged section 34 and shaft 31 to facilitate application of fluid pressure as described hereinafter in the arrangement shown.

A pair of stators 21 are provided to be secured to opposite sides of body 1 and as indicated have free edges at opposite ends thereof (which in the assembled form are located, respectively, adjacent the inner surface of heads 6,7) and an outer edge (which in assembled form is located adjacent the surface of enlarged section 34). Each stator 21 is received inside body 1 to be positioned in parallel relation with the longitudinal axis of body 1 and secured, for example, by screws 3A. Each stator is generally the same length as body 1 and a gasket 22 is provided to be received between the inner surface of the stator and body 1 to prevent fluid leakage through apertures 3 provided in body 1. Also each stator 21 is provided with a peripherial groove 23 in the free edges and outer edge and adapted to receive a channel shaped sealing member 28S which can be similar to sealing member 28 within the scope of the present invention received in grooves 38 of vanes 37.

A longitudinally extending groove 25 can be provided in each side of each stator 21 where one of the grooves 25 is adapted to be positioned in aligned relation with an aperture 15A of one head 6,7 as described hereinafter to facilitate selective admission/emission of fluid to and from chamber 2. A post 26 is provided at the end of each stator and retained in the opposite groove 25 to be received in an alignment aperture 17 of head 6, 7, (the apertures 17 of head 6 not being shown).

The unit is assembled as indicated in FIG. 1 and held by bolts 27 which have threaded ends 27A received in holes 7A of head 7 and extend between heads 6 and 7 with body 1 therebetween to receive nuts 27B on threaded ends 27C.

Figure 2:
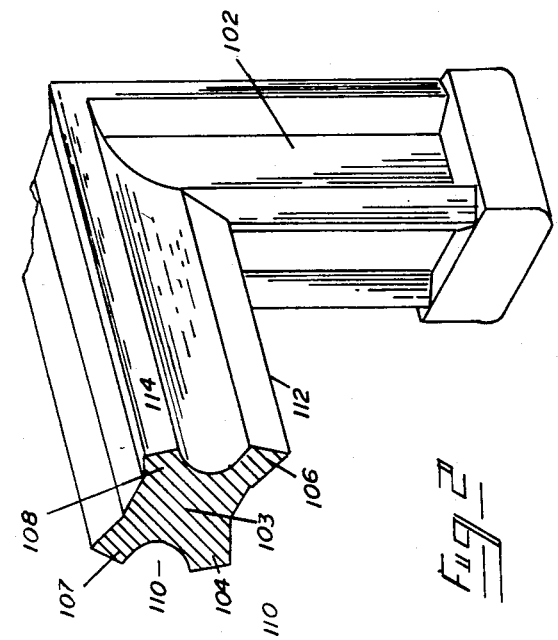
FIG. 2 is a perspective view partially in section of a vane seal within the scope of the present invention.

Referring to FIG. 2 a perspective view of a seal within the scope of the present invention is shown which can be used for any of the seals 28 or 28S but for convenience the seal will be referred to generally by the numeral 28. The seal as shown is channel shaped including an elongate web segment 101 and laterally extending generally parallel legs 102 at opposite ends. Pads 29 are provided at the ends of legs 102 to seal on sealing rings 11 as previously described and shown in FIGS. 6, 7 and 8.

Figure 3:
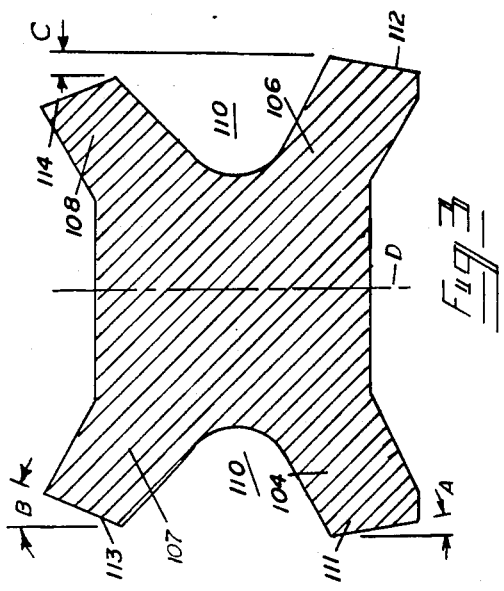
FIG. 3 is a cross-section view of the seal of FIG. 2.

In cross section, as shown in FIGS. 2 and 3, a central body section 103 is provided with sealing feet 104 and 106 extending outwardly from central body 103 on the lower side of the base and sealing feet 107 and 108 extending outwardly from central body 103 on the upper side of the base. Elongate recesses 109 and 110 are defined by and between feet 104-107 and 106-108 as shown.

Figure 5:
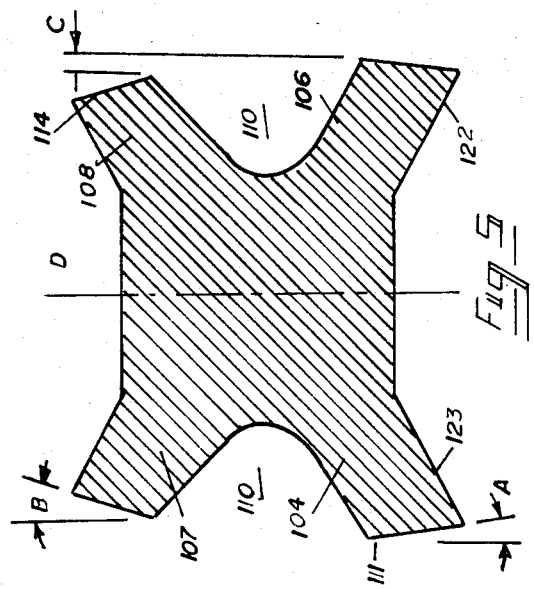
FIG. 5 is a cross-section view of another seal configuration within the scope of the present invention.

As shown in FIG. 3, the outermost edge of feet 104 and 106, which are received in grooves, for example grooves 38 of stators 37 or grooves 23 of stators 21 as described hereinafter, extend outwardly beyond the outermost edges of feet 107, 108 by a selected dimension C. Also within the scope of the present invention with reference to a plane D passing longitudinally through web 101 and legs 102 of the seal member as shown in FIGS. 3-5 as shown in FIG. 3 the outer surfaces 111 and 112 of feet 113 and 114 can be disposed at selected angles B while surfaces 111 and 112 of feet 104 and 106 are inclined at an angle A.

Figure 4:
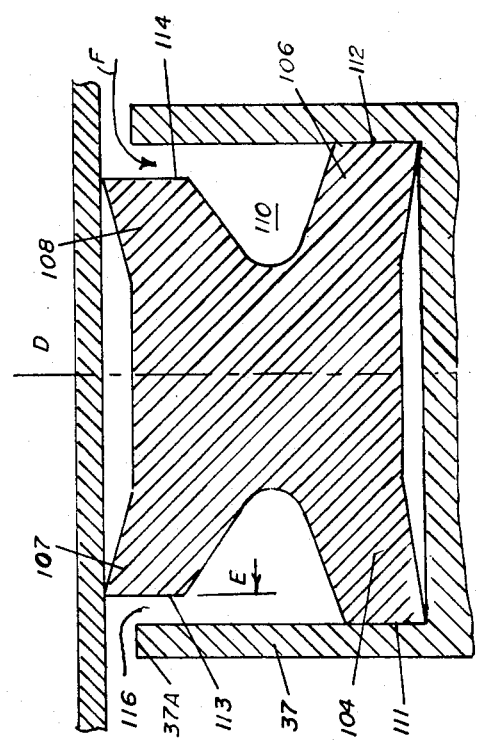
FIG. 4 is a cross-section of the seal of FIG. 3 in place in loaded condition.

Accordingly, and further in accordance with the present invention when seal 28 is placed in position in a groove as shown in FIG. 4 and loaded vertically, for example by engagement of feet 107 and 108 with the inner surface of tube 1 as shown, or by engagement with enlarged portion 34A of rotor 34 when the seal is used as a stator seal (not shown), feet 104 and 106 are urged downwardly and outwardly in groove 38 so that surface 111 and 112 are urged to sealing relation with the opposite walls and the base 38B of groove 38 to form what has been found to be a superior seal.

It will also be noted that (FIG. 4) outermost surface 113 and 114 of feet 107 and 108, respectively, are disposed at an angle B with reference to axis D in the unloaded state and in the loaded state as shown in FIG. 7 approach a parallel with axis D. Additionally, because of the difference in extension of feet 111 and 112 with reference to feet 107 and 106 as shown by the dimension C the surface 113 and 114 are respectively inset from the opposite side of grooves 38 by a dimension E to provide openings 116 between the surface of tube 1, the top 37A of vane 37 and the surfaces 113, 114 and the sides of vane 37. Opening 116 advantageously provides access to channel 102 as shown by arrow F so that the fluid pressure in the chamber adjacent vane 37 is asserted on the feet 113 and 114 to urge the feet to sealing relation with the inner surface of tube 1.

Pads 29 at the end of legs 102 to be seated in the bottoms of groove 38 of vanes 37 and grooves 23 of stators 21 where the outer surfaces 29A of pads 29 are in sealing engagement with seal rings 11A as described hereinafter and shown in FIG. 2.

It will be noted that the cross section of the seal shown in FIG. 3 provides flattened surfaces 121, 122 at the bottoms of feet 111, 112. These surfaces are also shown in the view of the seal shown in FIG. 2.

However, within the scope of the present invention as shown in FIG. 5, the lower edges of feet 111 and 112 can be pointed as shown in FIG. 8 where pointed edges 123, 124 are shown. The seal configuration shown in FIG. 5 operates the same as the configuration shown in FIG. 3 when loaded as shown in FIG. 4.

Figure 6:
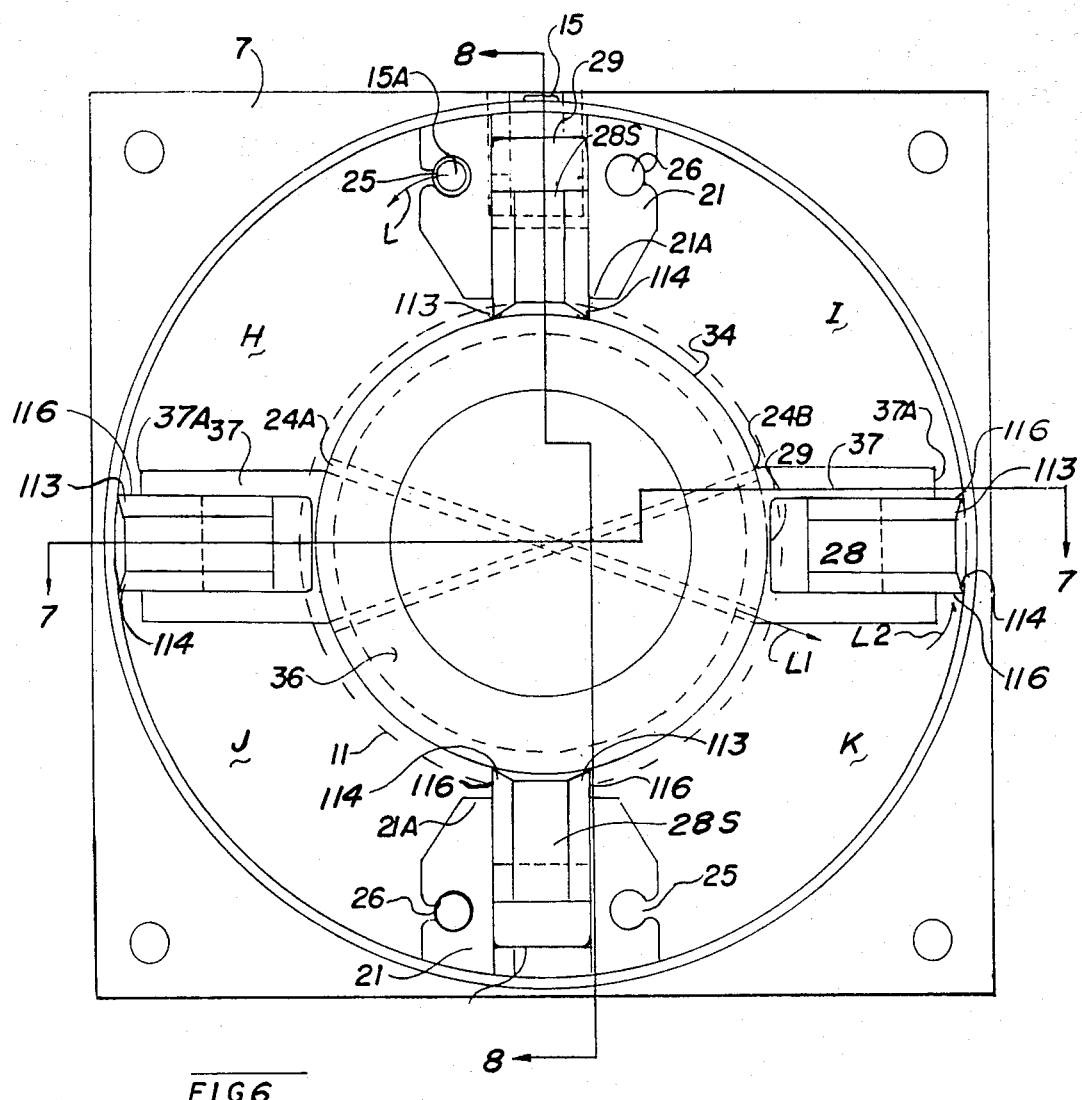
FIG. 6 is a view of the arrangement shown in FIG. 1 in assembled form with head 6 removed.

FIG. 6 is an end view illustration of the device shown in FIG. 1 in assembled form with head 6 removed so stator assemblies 21 are shown in vertical orientation and the end of assembled rotor 36 is shown with vanes 37 in horizontal position. Vane seals 28 and stator seals 28S similar to the seal shown in FIGS. 2-4 are shown in position.

It will be noted that feet 113, 114 of seals 28S seal on the enlarged surface 34 of rotor 31 while feet 113 and 114 of seals 37 37 seal in the inner surface of the body 1.

Vane seals 28 are disposed with feet 113-114 along the outer periphery of the seals as described hereinafter bearing on the inner surface of body 1.

FIG. 6 also illustrates how pressure in the chamber 2 defined by body 1 assists in sealing. In FIG. 6 chambers H, I, J, K are defined by vanes 37 and stators 21 respectively as shown. For purposes of discussion it can be assumed that fluid is supplied to Chamber H from an inlet 15A as indicated by arrow L and bleeds through cross bore 24A so fluid represented by arrow L1 is admitted to chamber K to rotate vanes 37 in a counterclockwise direction.

The operation of the seals is illustrated by reference to arrow L2. As previously described seals 28 are provided with grooves 110 to allow pressure in the chambers H-I to be applied to the inner sides of feet 113-114. As previously described vanes 37 have edges 37A inset from the inner-surface of body 1 to define an of opening 116 for flow of fluid and application of fluid pressure to the feet 113 and 114 of seals 28 to urge the vanes to sealing relation with the surface of body 1. A similar relationship occurs with respect to seals 28S of stators 21 where opening 116 is defined between edge 21A of stator 21 and the surface of enlarged portion 34 of rotor 31.

It has been found that the present invention advantageously provides arrangements where as the fluid pressure is increased in chambers H and K feet 114 and 113 are urged to tighter contact with the cooperative sealing surface.

In accordance with another feature of the present invention a pad 29 is provided for each vane seal 28 as previously described and engages a portion of the exposed surface of ring seal 11 (the seal 11 of head 6 being shown in dotted line in FIG. 6) to provide sealing as shown in FIGS. 7 and 8 between ring 8 and surface 29A of parts 29. FIGS. 6, 7 and 8 further illustrate that ring 11 engages both the surface 29A of pad 29 of the seals 28 of vanes 37 and a portion of enlarged portion 34 of vane assembly 36 to provide a seal therebetween.

FIG. 6 further illustrates the relative positions of grooves 25 provided in stators 21 for fluid flow to chambers H and K to move vanes 37 and rotate shaft 31.

With reference to FIG. 7 the sealing engagement between vane seals 28, head 6 and body member 1 is shown. More particularly in FIG. 7 lip 113 of a seal 28 of vane 37 is shown in sealing relation on inset surface 10 of head 6 and also with the inner surface of body 1.

FIG. 7 also illustrates the engagement between ring seal 11 which is received in groove 9 in spaced relation from apertures 13, and surface 29A of pad 29 of each seal 28. The view further illustrates that ring seal 11 also engages a portion of the end of enlarged portion 34 of rotor assembly 36 to provide a seal so that there is no need to provide a seal directly on the periphery of shaft 31 as in the prior art.

As can be seen from FIG. 8 which illustrate the sealing provided for stators 21 it will be recognized that the ends 21a of stator assemblies 21 are adjacent to the enlarged portion 34 of rotor assembly 31. Seal 11 is shown and illustrates that seal member 11 bears both on the outer periphery of enlarged portion 34 of shaft assembly 36 and the lip portions 113 and 114 of stator seal 28S of stator 21 to provide sealing.

Body member 1 is shown as it contacts seal 16 in groove 12 of head member 6 with stators 21 as shown. As also shown, ring seal 11 is shown disposed in groove 9 of head 6 and stator seal 28S is shown with lips 113 bearing on enlarged portion 34 of the shaft assembly 36. Pad 29S of seal 28S is shown engaging the inside surface of head 6 and the inner surface of body member 1 at the joint thereof. It will further be noted that ring seal 11 engages lips 113-114 of seal 28S to provide a seal.

It will be recognized that the foregoing are but examples of arrangements within the scope of the present invention and it will be understood that other arrangements within the scope of the present invention will occur to those skilled in the art upon reading of the disclosure set forth hereinbefore.

The invention claimed is:

1. A channel shaped elastomeric seal member including an elongate web member, and parallel laterally extending leg members at the ends of said web to be received in a channel shaped groove of a selected element having a first channel groove to receive said web and mutually parallel second channel grooves extending laterally from opposite ends of said first channel groove to receive said leg members, said first channel groove and said second channel grooves each being defined by a base and opposed spaced sides to sealably engage a channel shaped sealing surface adjacent said element where fluid pressure is selectively applied to at least one side of said seal and where said seal member, in cross section, includes a central body with first and second spaced feet extending outwardly therefrom to be received in and engage said opposite sides and said base of said first and second grooves, and third and fourth feet extending outwardly from said web and said leg members along a portion thereof to slidably engage said sealing surface wherein fluid can be applied to at least one of said third and fourth feet to urge said at least one of said third and fourth feet to sealing relation with said sealing surface.

2. The invention of claim 1 wherein said first and second feet and said third and fourth feet extend outwardly from said central body at acute angles relative to a longitudinal axis of said first central body and said leg members.

3. The invention of claim 1 wherein said sealing member is of generally "X" shaped cross section.

4. The invention of claim 3 wherein pad members are provided at the extremities of said leg member to be received adjacent the ends of said second groove members and where said pad members are of cross sectional area greater than the cross sectional area of said leg member.

5. The invention of claim 1 wherein said first and second feet include outer surfaces disposed at an acute angle relative to a line parallel to a plane passing longitudinally through the said web and said leg members, and wherein the width of said seal members between the outermost edges of said first and second feet received in said first and second groove means is greater than the width of said first and second grooves so that when said first and second feet of said web and said leg members of said seal members are placed in said first and second groove means the outer surface of said first and second feet are disposed generally parallel to said plane.

6. The invention of claim 1 wherein said first and second feet include outer surfaces to engage the sides of said first and second groove means where said outer surfaces are disposed at an acute angle relative to a plane passing longitudinally through and said web and leg members and where said outer surfaces are generally parallel to said transverse axis so when said seal member is located in said first and second grooves and engage said sides of said first and second grooves when said seal is in position in said grooves.

7. The invention of claim 1 wherein the maximum width of said seal member between the sides of said third and fourth feet is less than the width of said first and second grooves.

8. The invention of claim 7 wherein said third and fourth feet extend diagonally outwardly from said central body and have extremities located outwardly from said first and second grooves so that fluid pressure applied to one of said third and fourth feet urges at least one of said feet to sealing engagement with said sealing surface.

9. The invention of claim 1 wherein said element is moveable relative to said sealing surface.

10. The invention of claim 1 wherein said element is fixed relative to said moving sealing surface.

* * * * *